United States Patent
Kang et al.

(10) Patent No.: US 11,197,310 B2
(45) Date of Patent: Dec. 7, 2021

(54) CELL CYCLING UPLINK TRANSMISSION METHOD AND APPARATUS THEREFOR IN WIRELESS COMMUNICATION SYSTEM

(71) Applicant: LG Electronics Inc., Seoul (KR)

(72) Inventors: Jiwon Kang, Seoul (KR); Heejeong Cho, Seoul (KR); Genebeck Hahn, Seoul (KR); Ilmu Byun, Seoul (KR); Heejin Kim, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 16/093,128

(22) PCT Filed: Oct. 17, 2016

(86) PCT No.: PCT/KR2016/011619
§ 371 (c)(1),
(2) Date: Oct. 11, 2018

(87) PCT Pub. No.: WO2017/179781
PCT Pub. Date: Oct. 19, 2017

(65) Prior Publication Data
US 2021/0185707 A1      Jun. 17, 2021

Related U.S. Application Data

(60) Provisional application No. 62/321,225, filed on Apr. 12, 2016.

(51) Int. Cl.
*H04W 72/12*      (2009.01)

(52) U.S. Cl.
CPC ............... *H04W 72/1268* (2013.01)

(58) Field of Classification Search
None
See application file for complete search history.

(56) References Cited

U.S. PATENT DOCUMENTS

| 8,873,443 | B2 * | 10/2014 | Haim | H04W 52/243 |
| | | | | 370/311 |
| 9,503,989 | B2 * | 11/2016 | Haim | H04W 52/32 |
| 9,585,110 | B2 * | 2/2017 | Park | H04W 56/0005 |
| 10,098,070 | B2 * | 10/2018 | Haim | H04W 52/367 |

(Continued)

OTHER PUBLICATIONS

International Search Report in International Application No. PCT/KR2016/011619, dated Jan. 26, 2017, 16 pages (with English Translation).

(Continued)

*Primary Examiner* — Gregory B Sefcheck
(74) *Attorney, Agent, or Firm* — Fish & Richardson P.C.

(57) ABSTRACT

Disclosed is a method for a terminal for transmitting an uplink signal in a wireless communication system. Specifically, the method for transmitting an uplink signal comprises the steps of: transmitting a first uplink data signal in a first continuous time unit within a single subframe; and transmitting a second uplink data signal in a second continuous time unit in said single subframe, wherein a first timing advance (TA) value applied in the first continuous time unit and a second TA value applied in the second continuous time unit are different each other.

26 Claims, 10 Drawing Sheets

(56) References Cited

U.S. PATENT DOCUMENTS

| | | |
|---|---|---|
| 2013/0114505 A1* | 5/2013 | Haim ................ H04W 52/0216 370/328 |
| 2013/0195048 A1 | 8/2013 | Ekpenyong et al. |
| 2014/0086116 A1* | 3/2014 | Seo ........................ H04J 11/003 370/280 |
| 2014/0198744 A1* | 7/2014 | Wang ................... H04B 7/0626 370/329 |
| 2014/0226607 A1 | 8/2014 | Holma et al. |
| 2014/0269632 A1* | 9/2014 | Blankenship ......... H04W 76/15 370/336 |
| 2014/0370904 A1* | 12/2014 | Smith ................... H04W 8/005 455/450 |
| 2016/0337839 A1* | 11/2016 | Chae ................. H04W 72/1263 |
| 2017/0201958 A1* | 7/2017 | He .................... H04W 72/0413 |
| 2017/0264402 A1* | 9/2017 | Papasakellariou .. H04W 74/006 |
| 2017/0302419 A1* | 10/2017 | Liu ....................... H04L 5/0082 |

OTHER PUBLICATIONS

CATT, "Design of sPUSCH for shortened TTI," 'R1-162299', 3GPP TSG RAN WG1 Meeting #84bis, Busan, Korea Apr. 11-15, 2016, 5 pages.

InterDigital, "Short TTI PUSCH Design," 'R1-162966', 3GPP TSG RAN WG1 Meeting #84bis, Busan, Korea Apr. 11-15, 2016, 3 pages.

NTT Docomo, Inc., "PUSCH design for shortened TTI," 'R1-163173', 3GPP TSG RAN WG1 Meeting #84bis, Busan, Korea Apr. 11-15, 2016, 7 pages.

\* cited by examiner (A) CONTROL-PLANE PROTOCOL STACK (B) USER-PLANE PROTOCOL STACK

CELL CYCLING UPLINK TRANSMISSION METHOD AND APPARATUS THEREFOR IN WIRELESS COMMUNICATION SYSTEM

CROSS-REFERENCE TO RELATED APPLICATION

This application is a U.S. National Stage Application of PCT International Application no. PCT/KR2016/011619 filed on Oct. 17, 2016, which claims priority to U.S. Provisional Application No. 62/321,225 filed on Apr. 12, 2016, which is hereby incorporated by reference herein in their entirety.

TECHNICAL FIELD

The present invention relates to a wireless communication system, and more particularly, to a method for cell cycling uplink transmission in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the above discussion, the present invention proposes a method for cell cycling uplink transmission in a wireless communication system and apparatus therefor.

Technical Solution

In an aspect of the present invention, provided is a method of transmitting uplink signals by a User Equipment (UE) in a wireless communication system. The method may include: transmitting a first uplink data signal in a first continuous time unit within a single subframe; and transmitting a second uplink data signal in a second continuous time unit within the single subframe. In this case, a first Timing Advance (TA) value applied to the first continuous time unit may be different from a second TA value applied to the second continuous time unit.

In another aspect of the present invention, provided is a receiving end in a wireless communication system. The receiving end may include: a wireless communication module configured to transmit and receive signals to and from a plurality of transmitting ends; and a processor configured to process the signals. In this case, the processor may be configured to transmit a first uplink data signal in a first continuous time unit within a single subframe and transmit a second uplink data signal in a second continuous time unit within the single subframe. In addition, a first Timing Advance (TA) value applied to the first continuous time unit may be different from a second TA value applied to the second continuous time unit.

Preferably, a predetermined uplink signal may be transmitted to one or more transmitting ends, and the first and second TA values calculated based on the predetermined uplink signal may be received.

Preferably, the last symbol of the first continuous time unit or the first symbol of the second continuous time unit may be a muted symbol. Alternatively, when the second TA value is greater than the first TA value, the last symbol of the first continuous time unit or the first symbol of the second continuous time unit may be set to a muted symbol.

Additionally, control information for transmitting the first and second uplink data signals may be received in the first continuous time unit. In particular, the control information may include information on the first and second TA values.

Advantageous Effects

According to the present invention, a base station and a user equipment can perform uplink transmission and reception more efficiently by using a cell cycle scheme in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

In addition, in this specification, the term "base station (BS)" can be used as a comprehensive term that includes a Remote Radio Head (RRH), an eNB, a Transmission Point (TP), a Reception Point (RP), a relay, etc.

Figure 1:
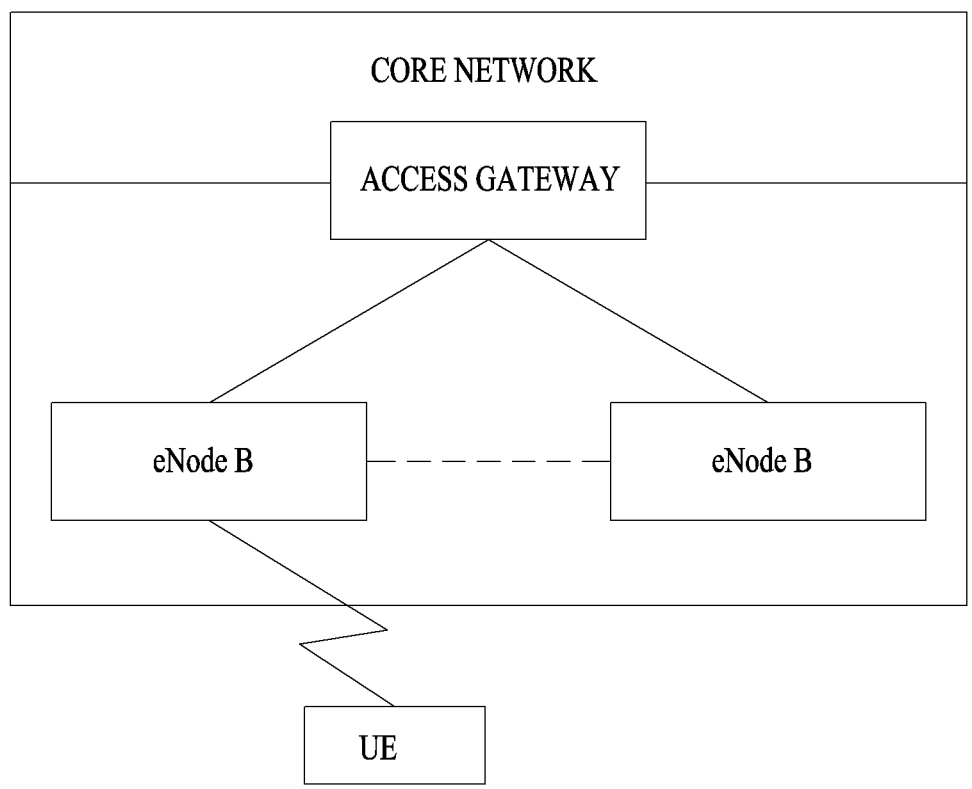
FIG. 1 is a diagram schematically illustrating a network structure of an E-UMTS as an exemplary radio communication system.
Figure 2:
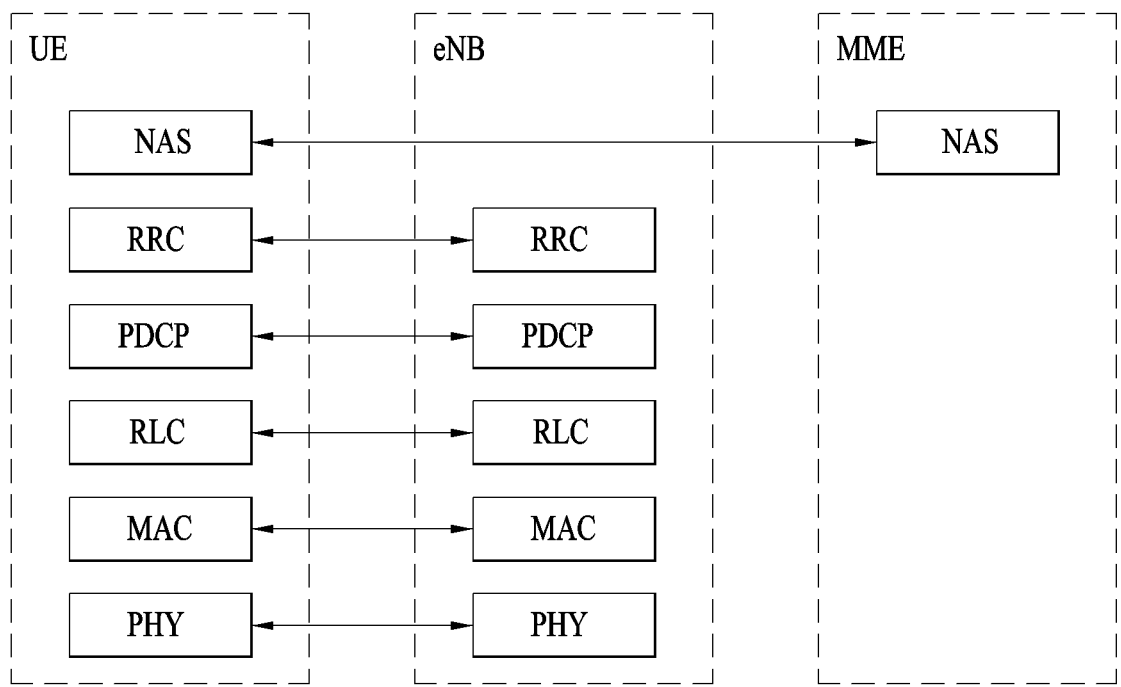
FIG. 2 is a diagram illustrating structures of a control plane and a user plane of a radio interface protocol between a UE and an E-UTRAN based on the 3GPP radio access network specification.
Figure 2:
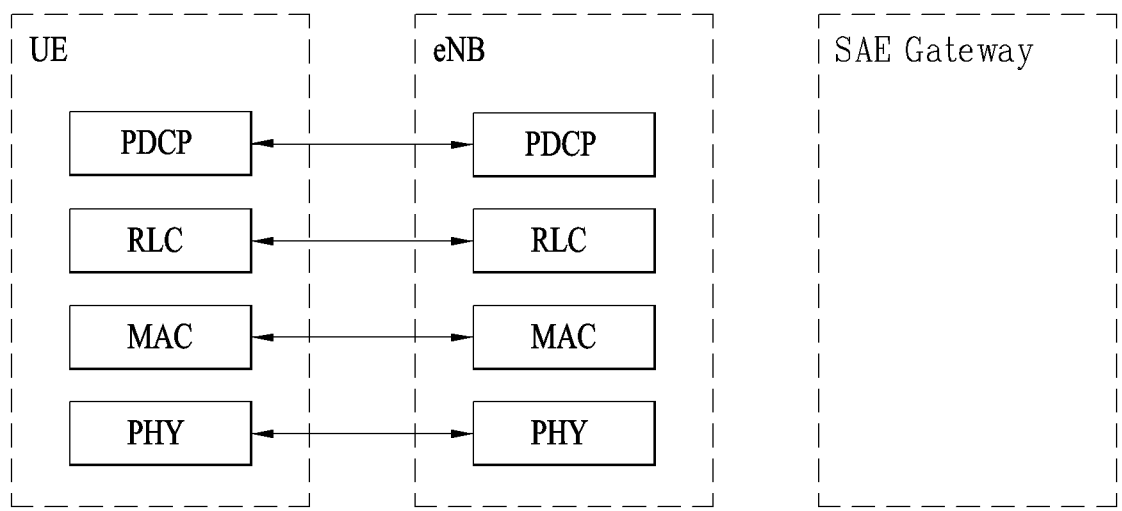

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
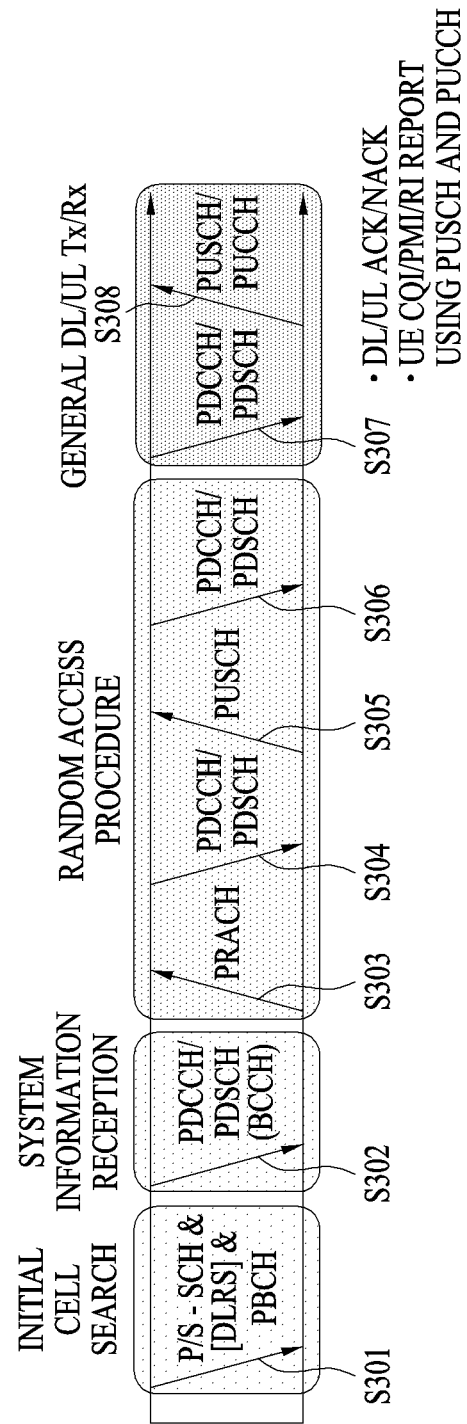
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
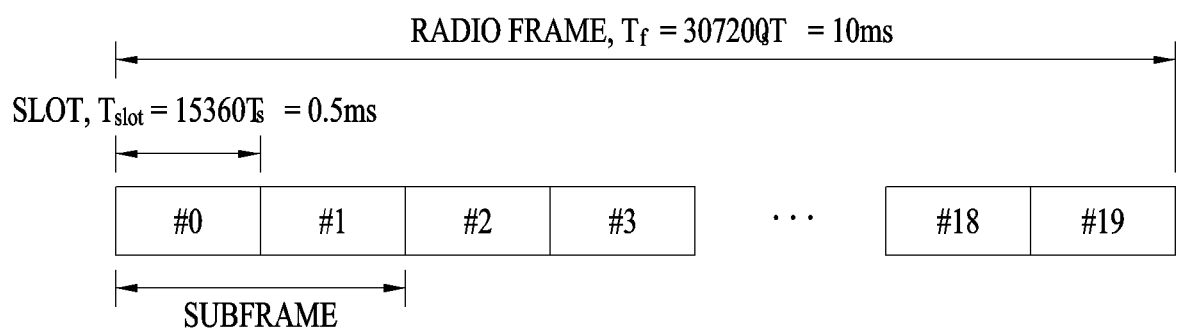
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10$^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
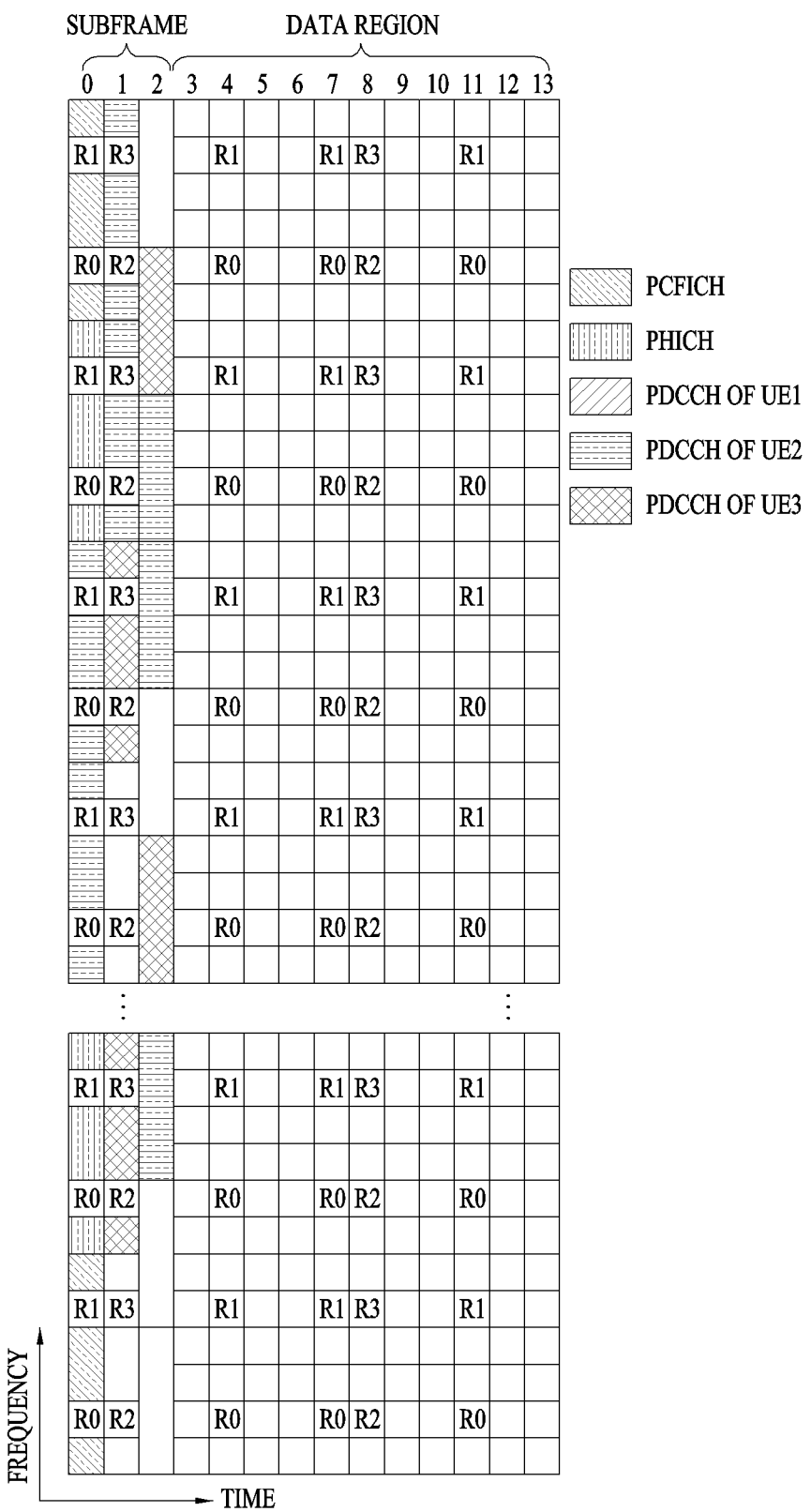
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4. Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
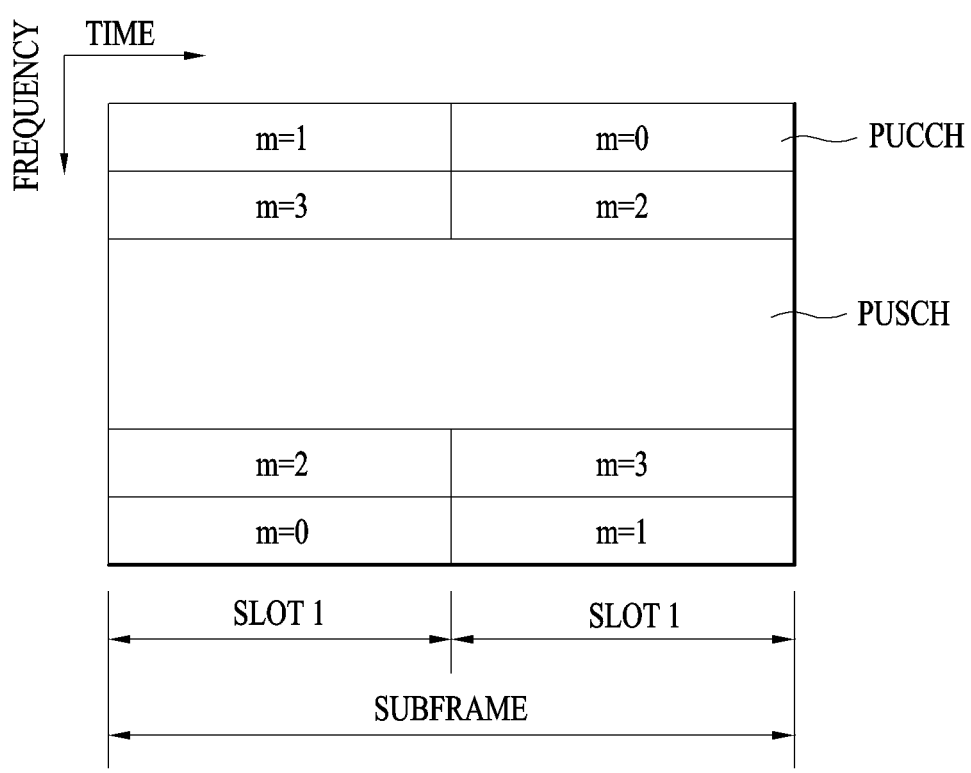
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Meanwhile, it is expected that the LTE-A system, which is the standard of a next generation mobile communication system, will support the Coordinated Multi-Point (CoMP) transmission scheme, which was not supported by the conventional standard, to increase a data transmission rate. In this case, the CoMP transmission scheme means a transmission scheme by which two or more BSs or cells cooperate with each other in communicating a UE, which is in a radio shadow area, in order to improve the communication performance between the UE and BS (a cell or sector).

The CoMP transmission scheme can be classified into a CoMP-Joint Processing (CoMP-JP) scheme in the form of cooperative MIMO based on data sharing and a CoMP-Coordinated Scheduling/Beamforming (CoMP-CS/CB) scheme.

According to the DL CoMP-JP scheme, a UE can receive data instantaneously and simultaneously from BSs that perform the CoMP transmission scheme. And, the UE may combine the received signals to improve reception performance (Joint Transmission (JT)). In addition, one of the BS performing the CoMP transmission scheme may transmit data to the UE at a specific time (Dynamic Point Selection (DPS)). In contrast, according to the CoMP-CS/CB scheme, a UE may receive data instantaneously from one BS, that is, a serving BS by means of beamforming.

According to the UL CoMP-JP scheme, each BS can receive a PUSCH signal simultaneously from a UE (Joint Reception (JR)). On the contrary, according to the CoMP-CS/CB scheme, only one BS receives a PUSCH. In this case, how the CoMP-CS/CB scheme will be used is determined by cooperative cells (or BSs).

Hereinafter, Channel State Information (CSI) reporting will be described. In the current LTE standards, there are two transmission schemes: open-loop MIMO operating without CSI and closed-loop MIMO operating based on CSI. In particular, in the closed-loop MIMO system, a BS and a UE can perform beamforming based on CSI to obtain multiplexing gain of MIMO antennas. To obtain CSI from a UE, a BS transmits a reference signal to the UE and instructs the UE to feed back the CSI measured based on the RS through a Physical Uplink Control Channel (PUCCH) or a Physical Uplink Shared Channel (PUSCH).

CSI is divided into the following three types: Rank Indicator (RI), Precoding Matrix Index (PMI), and Channel Quality Indication (CQI). First, the RI is the rank information of a channel as described above and indicates the number of streams that a UE can receive on the same time-frequency resource. Since the RI is determined by long-term fading of the channel, it is fed back to a BS with a periodicity longer than that of the PMI or CQI. Second, the PMI is a value that reflects the spatial characteristics of a channel and indicates a precoding matrix index of a BS, which is preferred by a UE, based on a metric such as an SINR. Lastly, the CQI is a value indicating the strength of a channel and indicates a received SINR obtainable when a BS uses the PMI.

Hereinafter, a reference signal (RS) will be described.

In general, for channel measurement, a reference signal previously known to both transmitting and receiving ends is transmitted with data from the transmitting end to the receiving end. The reference signal provides information on a modulation scheme as well as information for the channel measurement so that demodulation can be performed. The reference signal is classified into: a Dedicated Reference Signal (DRS) for a BS and a specific UE, i.e., a UE-specific reference signal; and a Cell-specific Reference Signal (CRS) for all UEs in a cell, i.e., a common RS. In addition, the CRS includes a reference signal used by a UE to measure CQI/PMI/RI and report the same to a BS, which is referred to as a Channel State Information Reference Signal (CSI-RS).

Meanwhile, the current cellular system has evolved from 4G to 5G. For use of the 5G communication system, the requirements for supporting not only conventional enhanced mobile broadband (eMBB) services based on smartphones but also various Internet of Things (IoT) application services such as health care, disaster and safety management, vehicle communication, manufacturing plant control, robot control, etc. have been defined. In supporting the IoT application services, how much time is required for data transmission and how reliably data transmission can be performed become more important than the data transmission rate, which has been considered as a main issue in the prior art. In 3GPP, such a service is named as Ultra-Reliable Low Latency Communication (URLLC).

In the URLLC, it becomes important to secure reliability with respect to a radio channel state. Regarding the reliability, the requirement of a radio link is generally defined as follows: the probability of transmitting a y-bytes packet in x microseconds should be equal to or higher than z %. For example, it can be defined that the probability of transmitting a 100-byte packet in 1 microsecond should be equal to or higher than 99.999%. The most difficult thing in satisfying such a requirement is that if the quality of a radio channel is significantly degraded, the capacity of the corresponding channel does not satisfy the above-described requirement.

The present invention proposes to solve this issue by obtaining cell/BS diversity. In other words, assuming that a UE transmits the same data to multiple cells/BSs/RPs, even if a radio channel of a specific cell/BS/RP is degraded, the UE can transmit information to another cell/BS/RP with a relatively good channel state. By doing so, the reliability requirement can be satisfied. To this end, the present invention proposes the following methods.

For uplink transmission, a UE alternately perform data transmission to a plurality of cells/BSs/RPs according to a predetermined order, that is, the UE performs cell cycling uplink transmission. In performing the continuous transmission, uplink grant information is signaled to the UE one time.

In applying this method, various methods can be considered to configure uplink signals to be transmitted to individual cells/BSs/RPs. The simplest method is that one same signal is repeatedly transmitted to individual cells/BSs/RPs. That is, a signal to which the same channel coding is applied based on the same information bits can be transmitted to individual cells/BSs/RPs sequentially and repeatedly. Alternatively, a method of coding one information bit by reducing a coding rate in proportion to the number of participating cells/BSs/RPs and transmitting the coded bits to the cells/BSs/RPs in a distributed manner can also be considered. These methods can be categorized into extended channel coding and separated channel coding.

1) Extended Channel Coding

The extended channel coding means a scheme of applying channel coding such that one decoder can perform decoding by transmitting different parity bits of encoded codewords to different cells/BSs/RPs. The extended channel coding can be classified as follows according to whether information bits are repeated or not.

(1) Channel coding where information bits are repeated: According to this channel coding scheme, for a Transport Block (TB) to be transmitted to different cells/BSs/RPs, same information bits are configured, but different parity bits are configured. By determining parity bits to be used for encoding in advance, it is possible to avoid the parity bits of the different cells/BSs/RPs from overlapping. For example, when there are N cells/BSs/RPs, all parity bits, which occurs during encoding, are divided into N groups, and each cell/BS/RP is configured to use parity bits in a corresponding group. In this case, if a device receives a corresponding signal, the device can obtain parity group information transmitted to each cell/BS/RP and perform decoding by assorting parity bits in TBs transmitted to the individual cells/BSs/RPs per group.

(2) Channel coding where no information bits are repeated: According to this channel coding scheme, different cells/BSs/RPs create one TB group by grouping a plurality of TBs and perform channel coding based on the size of the TB group. This scheme has an advantage in that the greatest channel coding gain can be obtained, but it also has a disadvantage in that decoding can be performed only when all cells/BSs/RPs perform TB reception.

2) Separated Channel Coding

The separated channel coding can be classified into a repetition-based Log Likelihood Ratio (LLR) combining scheme and a hard value combining scheme. In the former case, the same size of TBs are repeatedly transmitted to different cells/BSs/RPs. If a device receives a corresponding signal, the device can obtain LLR values by performing processes before decoding in an independent manner. Thereafter, the device can use the sum of calculated LLR values as one input value for a decoder.

According to the hard value combining scheme, the same size of TBs are repeatedly transmitted to different cells/BSs/RPs. In addition, TBs received at the different cells/BS/RPs are independently decoded by a corresponding cell/BS/RP. In this case, if any one of the TBs received by the different cells/BSs/RPs is successfully decoded, it is determined that signal reception is successful.

For the above-described cell cycling uplink transmission, a network schedules scheduling information for a plurality of consecutive subframes in the first subframe only one time, and a plurality of cells/BSs/RPs participate in uplink transmission at the plurality of consecutive subframes.

In this case, information indicating whether uplink scheduling is performed on the plurality of consecutive subframes is provided to a UE through higher layer signaling such as a MAC layer message, an RRC layer message, etc. Alternatively, the information may be provided to a UE together with uplink scheduling information. In case a UE is able to know that URLLC information will be transmitted in advance, the corresponding information may be omitted. Additionally, it is regulated that when a UE receives an uplink grant in a specific subframe, the UE should not perform any action of searching for other uplink grants, for example, blind decoding during N consecutive subframes after the specific subframe.

Figure 7:
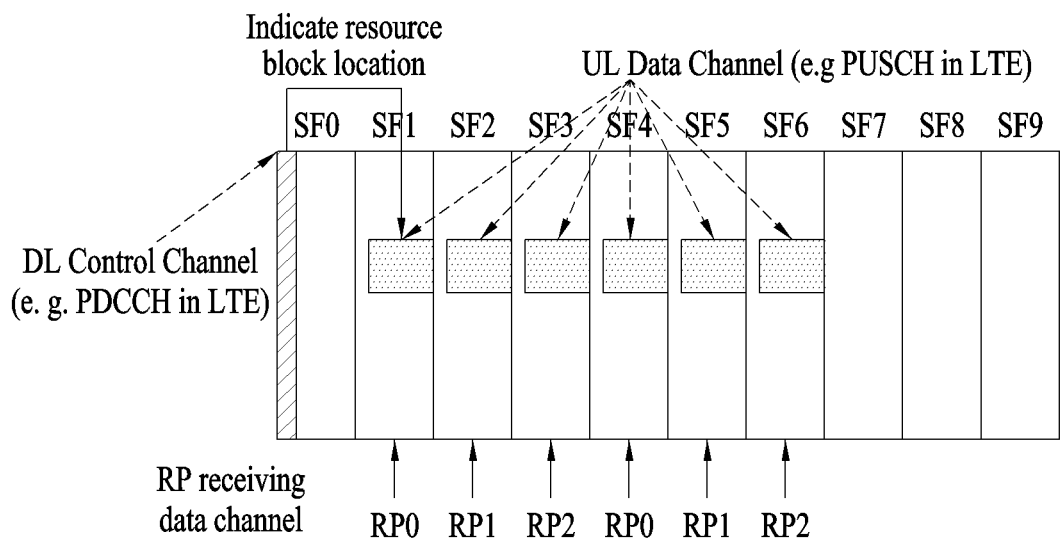
FIGS. 7 and 8 illustrate examples of scheduling for cell cycling uplink transmission according to an embodiment of the present invention.
Figure 8:
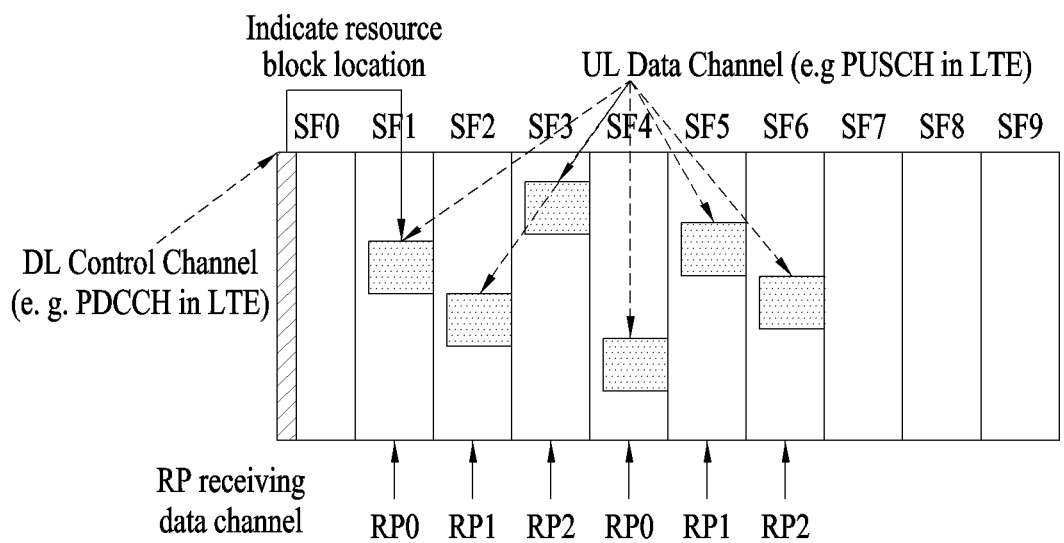

FIGS. 7 and 8 illustrate examples of scheduling for cell cycling uplink transmission according to an embodiment of the present invention.

Specifically, FIG. 7 shows an example where a resource scheduled in the first subframe continues in a plurality of consecutive subframes, and FIG. 8 shows an example where a resource scheduled in the first subframe hops in a plurality of consecutive subframes according to a predetermined rule. When resource hopping is applied, it has an advantage in that frequency diversity can be obtained even when channel quality measurement for multiple cells are not completely performed. When the network supports both the case where the resource hopping is applied and the case where there is no resource hopping, whether the resource hopping is applied or not may be signaled to a UE through physical layer information or higher layer information. Although this example assumes the TDD system, the present invention can be applied to the FDD system even if downlink and uplink control channels are allocated to different frequency bands.

In the above description, the basic unit for switching uplink transmission to cells/BSs/RPs is assumed to be a subframe, but the present invention is not limited thereto. For example, a method for switching uplink transmission every multiple symbol groups can be considered.

Figure 9:
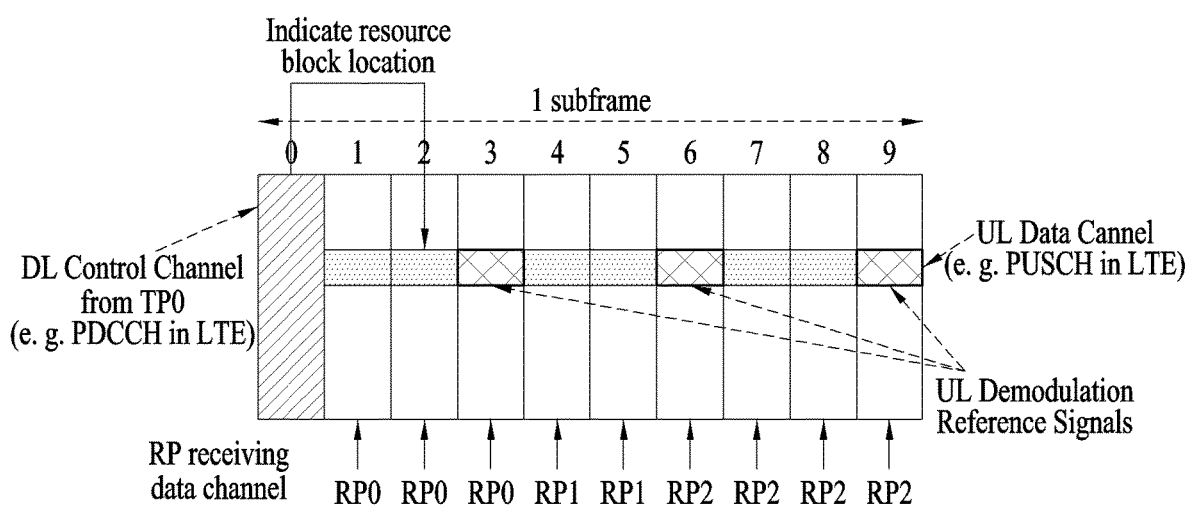
FIG. 9 illustrates an example of performing the cell cycling uplink transmission according to the embodiment of the present invention on a symbol-group basis.

FIG. 9 illustrates an example of performing the cell cycling uplink transmission according to the embodiment of the present invention on a symbol-group basis. Specifically, FIG. 9 shows an example of performing transmission to a plurality of RPs alternately every three symbols.

Hereinafter, for convenience of description, the unit time required to perform transmission to each cell/BS/RP, for example, a single subframe of FIGS. 7 and 8 or three symbols of FIG. 9 is defined as a Time Unit (TU).

Particularly, it is desirable that when a UE performs the cell cycling uplink transmission according to the embodiment of the present invention, the UE transmits at least one uplink demodulation reference signal (DM-RS) in each TU. This is because different cells/BSs/RPs perform reception in each TU.

In performing the cell cycling uplink transmission according to the embodiment of the present invention, a network signals to a UE at least one piece of the following information (a) to (b) regarding a plurality of cells/BSs/RPs that participate in uplink data reception.

(a) ID information of cells/BSs/RPs that will perform reception on each TU (b) Physical resource locations and/or sequence information of reference signals for cells/BSs/RPs that will perform reception on each TU Since reference signals transmitted in each TU are received by different cells/RPs, physical resource (time/frequency) locations and/or sequences corresponding to different cell/RP IDs may be used. Thus, the corresponding information should be signaled to allow a UE to transmit these reference signals. For example, the IDs of participating cells/RPs can be directly transmitted as described in (a). Alternatively, the scrambling ID of a reference signal can be transmitted as described in (b), and in this case, the network may transmit information on a scrambling ID set of continuously transmitted reference signals to the UE in a physical layer or higher layer message.

In particular, considering that for a cell/RP that provides an uplink grant, the first TU can be used to inform predetermined cell/RP IDs and scrambling IDs of reference signals, it is possible to signal information on the subsequent reference signals except information on the first TU.

Meanwhile, if a UE uses consecutive TUs for the cell cycling uplink transmission according to the embodiment of the present invention, the UE can apply a different Timing Advance (TA) value to each TU. In this case, it is preferred to perform muting on symbols at TU boundary points. This is because when the UE transmits signals to BSs, each of which is located at a different distance from the UE, each TU may have different uplink time synchronization.

For example, when a UE performs transmission on N consecutive TUs, the UE may perform muting on the last symbols of the first to $(N-1)^{th}$ TUs or the first symbols of the second to $N^{th}$ TUs and then apply an different TA value per TU. For example, muting may be performed only when the TA value of the subsequent TU is greater than that of the previous TU.

The above-described muting operation could be interpreted in various ways, for example, as dropping transmission of a specific physical signal or channel, puncturing or rate matching of Resource Elements (REs) corresponding to symbols for the specific physical channel.

Figure 10:
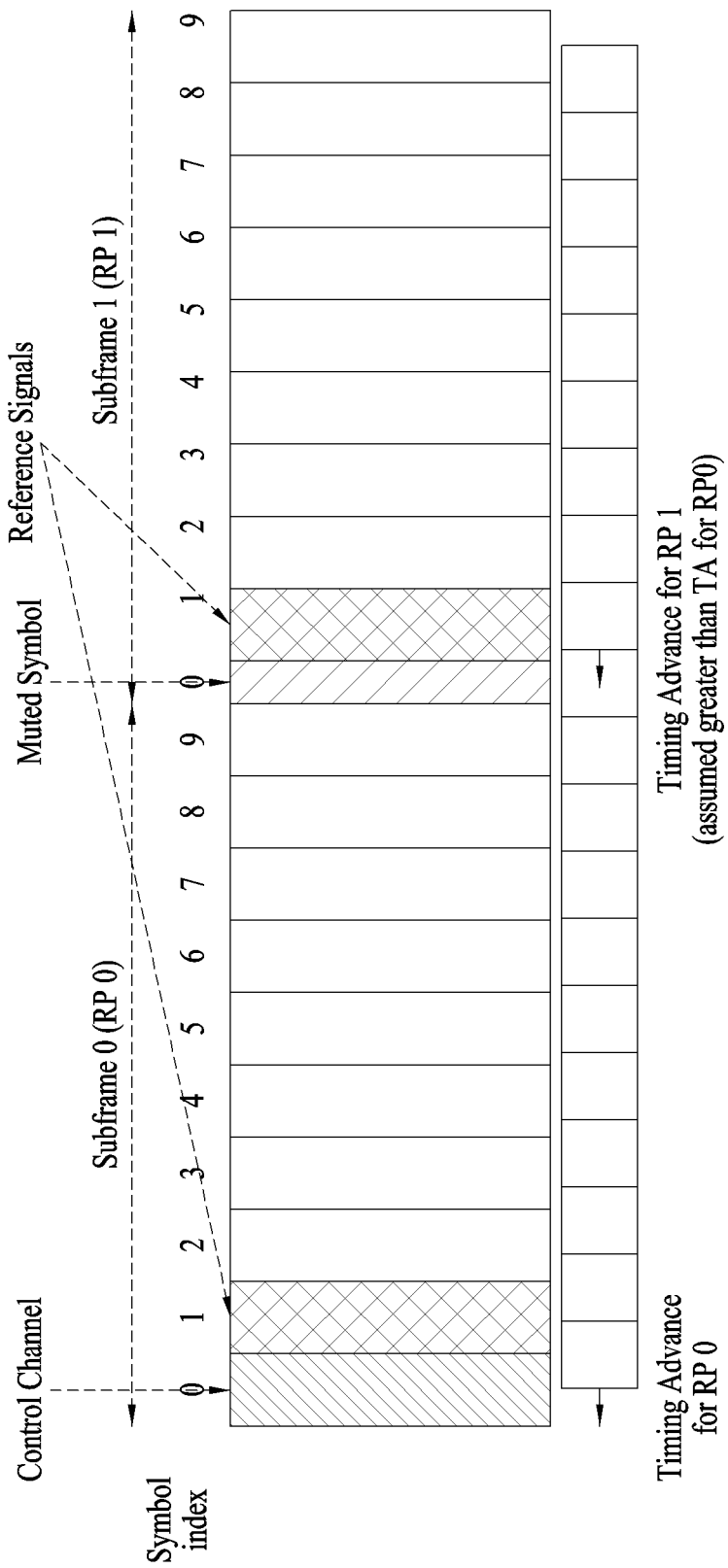
FIG. 10 illustrates an example of muting operation in the cell cycling uplink transmission according to the embodiment of the present invention.
Figure 11:
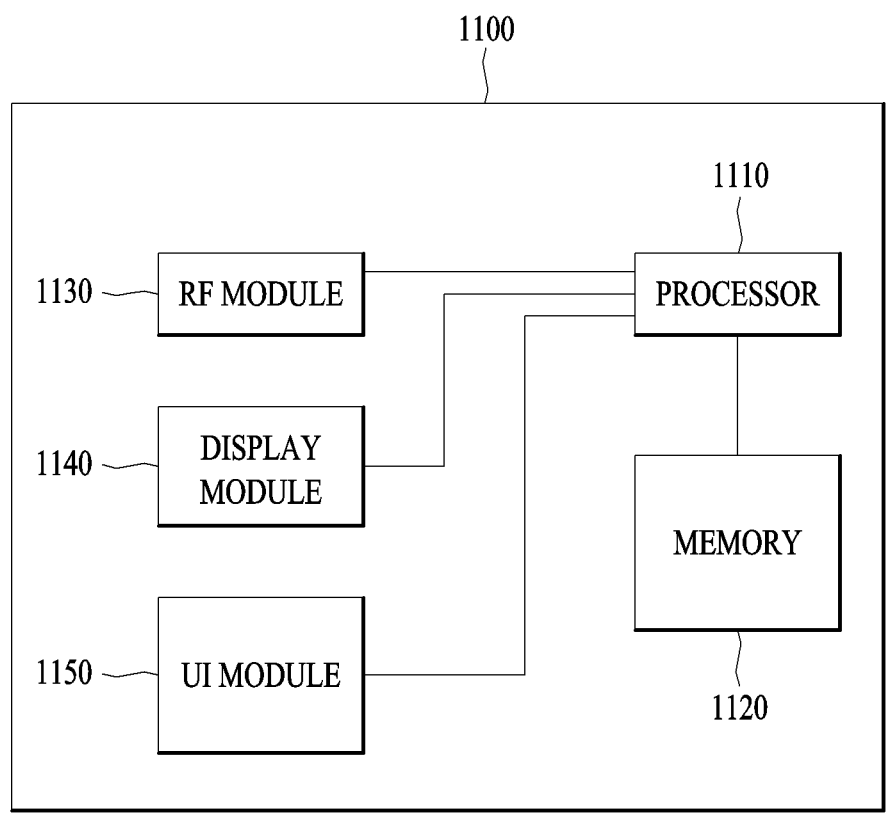
FIG. 11 is a block diagram of a communication apparatus according to an embodiment of the present invention.

FIG. 10 illustrates an example of the muting operation in the cell cycling uplink transmission according to the embodiment of the present invention. In particular, FIG. 11 shows a case where the TA value of the second TU is greater than that of the first TU so that transmission can be not performed in the first symbol of the second TU. Thus, it can be seen that the first symbol of the second TU is muted. If the TA value of the second TU is smaller than that of the first TU, the first symbol of the second TU may not need to be muted.

Additionally, synchronization between cells needs to be considered in the cell cycling uplink transmission according to the embodiment of the present invention.

To this end, methods (A) and (B) can be considered. According to method (A), a network provides a list of BSs/cells/RPs, which are likely to perform continuous transmission, to a UE via higher layer signaling in advance. Upon receiving a corresponding message, the UE may receive configuration values for achieving uplink time synchronization, i.e., TA values in advance by transmitting specific uplink signals, for example, PRACHs, uplink reference signals, etc. to the individual BSs/cells/RPs in order to handle the case where the UE performs the continuous uplink transmission to the BSs/cells/RPs included in the corresponding list. Alternatively, according to method (B), after receiving a specific uplink signal, for example, a PRACH, an uplink reference signal, etc. from a UE, each of a plurality of BSs/cells/RPs may transmit a configuration value for achieving uplink time synchronization, that is, a TA value to the UE.

According to method (A), when a UE accesses a specific BS/cell/RP, the corresponding BS/cell/RP instructs the UE to transmit uplink signals so that the UE can obtain uplink synchronization configuration values for additional BSs/cells/RPs. On the other hand, according to method (B), when a UE transmits a specific uplink signal, a plurality of BSs/cells/RPs that will receive data sequentially receive the corresponding signal, and the individual BSs/cells/RPs or a representative BS/cell (for example, serving cell) signals a plurality of uplink synchronization configuration values.

Although the present invention assumes that uplink transmission is performed to different BSs/cells/RPs, which are physically away from each other, the invention is not limited thereto. When BSs installed at the same physical locations manage multiple frequency bands (carriers), the methods of the present invention can be applied by considering each of the frequency bands as a logical cell. In other words, the present invention can be applied when transmission is sequentially performed on different carriers according to a predetermined order in order to obtain frequency diversity gain. Similarly, the present invention can be extensively applied when different BSs/cells/RPs use different carriers. Further, the invention can be applied when uplink transmission is performed via different (reception) beams or panels of the same BS in each predetermined time unit.

FIG. 11 is a block diagram of a communication apparatus according to one embodiment of the present invention.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present invention described with reference to the drawings. For a detailed description of the operation of the processor 1110, reference may be made to the description associated with FIGS. 1 to 10.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation explained as performed by a BS can be performed by an upper node of the BS in some cases. In particular, in a network constructed with a plurality of network nodes including a base station, it is apparent that various operations performed for communication with a UE can be performed by a BS or other network nodes except the BS. The term "base station (BS)" can be replaced with terms such as a fixed station, a Node B, an eNodeB (eNB), an access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method for cell cycling uplink transmission in a wireless communication system and apparatus therefor are described based on the 3GPP LTE system, the method and apparatus can be applied to various wireless communication systems as well as the 3GPP LTE system.

What is claimed is:

1. A method of transmitting uplink signals by a User Equipment (UE) in a wireless communication system, the method comprising:
receiving a first Timing Advance (TA) value and a second TA value;
transmitting a first uplink signal in a first continuous time unit; and
transmitting a second uplink signal in a second continuous time unit,
wherein the first TA value applied to the first continuous time unit is different from the second TA value applied to the second continuous time unit,
wherein the first continuous time unit is not overlapped with the second continuous time unit,
wherein a last symbol of the first continuous time unit or a first symbol of the second continuous time unit is muted based on the second TA value being greater than the first TA value, and
wherein the first uplink signal and the second uplink signal represent the same set of information bits.

2. The method of claim 1, wherein each of the first continuous time unit and the second continuous time unit includes at least one demodulation reference signal (DMRS).

3. The method of claim 1, wherein control information including scheduling information for transmitting the first and second uplink signals is received one time.

4. The method of claim 1, wherein the muting is conducted when a difference between the first TA value and the second TA value is under a pre-defined value range.

5. The method of claim 1, wherein the first uplink signal and the second uplink signal are generated from the same transport block.

6. The method of claim 1, wherein the first and second TA values are received in response to different pre-transmitted uplink signal, respectively.

7. The method of claim 6, wherein the pre-transmitted uplink signal is a Physical Random Access Channel (PRACH) signal.

8. The method of claim 1, wherein the first and second TA values are received in response to the same pre-transmitted uplink signal.

9. The method of claim 8, wherein the uplink signal is a PRACH signal.

10. The method of claim 1, wherein a first ID applied to the first uplink signal transmission of the first continuous time unit is different from a second ID applied to the second uplink signal transmission of the second continuous time unit.

11. The method of claim 10, wherein each of the first and second ID is applied to the generation of DMRS sequence transmitted in each of the first continuous time unit and the second continuous time unit.

12. The method of claim 10, wherein the second ID is received from a network.

13. The method of claim 10, wherein the first ID is received from a network or determined by a pre-defined rule.

14. A User Equipment (UE) configured to transmit uplink signals in a wireless communication system, the UE comprising:
a wireless communication module configured to transmit and receive signals; and
a processor configured to process the signals,
wherein the processor is configured to receive a first Timing Advance (TA) value and a second TA value, transmit a first uplink signal in a first continuous time unit and transmit a second uplink signal in a second continuous time unit,
wherein the first TA value applied to the first continuous time unit is different from the second TA value applied to the second continuous time unit,
wherein the first continuous time unit is not overlapped with the second continuous time unit,
wherein a last symbol of the first continuous time unit or a first symbol of the second continuous time unit is muted based on the second TA value being greater than the first TA value, and
wherein the first uplink signal and the second uplink signal represent the same set of information bits.

15. The UE of claim 14, wherein each of the first continuous time unit and the second continuous time unit includes at least one demodulation reference signal (DMRS).

16. The UE of claim 14, wherein control information including scheduling information for transmitting the first and second uplink signals is received one time.

17. The UE of claim 14, wherein the processor is further configured to mute the last symbol or the first symbol when a difference between the first TA value and the second TA value is under a pre-defined value range.

18. The UE of claim 14, wherein the first uplink signal and the second uplink signal are generated from the same transport block.

19. The UE of claim 14, wherein the first and second TA values are received in response to different pre-transmitted uplink signal, respectively.

20. The UE of claim 19, wherein the pre-transmitted uplink signal is a Physical Random Access Channel (PRACH) signal.

21. The UE of claim 14, wherein the first and second TA values are received in response to the same pre-transmitted uplink signal.

22. The UE of claim 21, wherein the uplink signal is a PRACH signal.

23. The UE of claim 14, wherein a first ID applied to the first uplink signal transmission of the first continuous time unit is different from a second ID applied to the second uplink signal transmission of the second continuous time unit.

24. The UE of claim 23, wherein each of the first and second ID is applied to the generation of DMRS sequence transmitted in each of the first continuous time unit and the second continuous time unit.

25. The UE of claim 23, wherein the second ID is received from a network.

26. The UE of claim 23, wherein the first ID is received from a network or determined by a pre-defined rule.

* * * * *